William C. Triplett
Walter H. Brauer, Jr.
George R. Garrison
INVENTORS

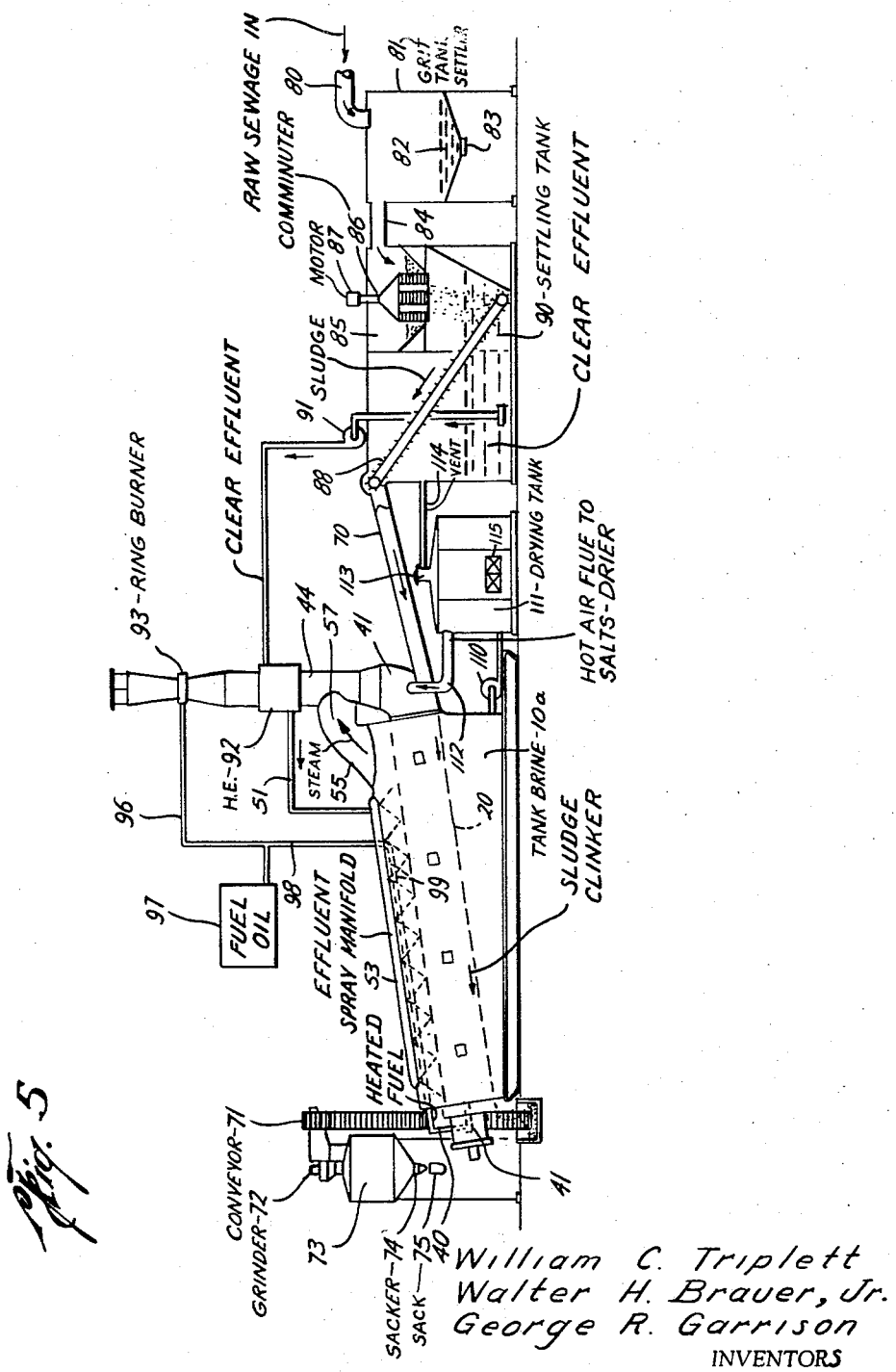

3,343,587
DRUM DRYING OF LIQUEFORM SUBSTANCES
William C. Triplett, 1 Capeheart, and Walter H. Brauer, Jr., Box 393, both of Ingleside, Tex. 78363, and George R. Garrison, 417 Southern, Corpus Christi, Tex. 78404
Filed Apr. 1, 1966, Ser. No. 539,340
7 Claims. (Cl. 159—10)

This invention pertains to method and apparatus for the treatment of liquid base fluents such as solutions, dispersions, emulsions, suspensions, and mixtures whereby the fluent liquid base is brought to a condition suitable for use or easy disposal. Examples of fluents suitable for treatment in accordance with the invention are salt water and sewage, from which fresh, clean, potable, useable or readily disposable water or steam is obtained. Since the invention is best adapted for use with fluents wherein the liquid base is water, the following description will assume a water base fluent.

The apparatus of the invention includes a stationary casing which may be in the form of a tubular shell. Inside the shell is disposed a tube of smaller outer diameter than the inside diameter of the shell, leaving a space therebetween which may extend all the way around the tube, with the largest space between the top of the shell and the top of the casing. The tube is preferably disposed with its axis horizontal or at a slight inclination, i.e. making an angle of 30 degrees or less to the horizontal. The tube is mounted for rotation about its tubular axis and is fed with burning fuel at one end, the fire projecting axially into the tube to heat the tube. A plurality of spray nozzles disposed above the tube in the space between the tube and casing bring the impure water into contact with the hot exterior surface of the tube, whereby water is flashed to steam. The impurities, both in solid form and as concentrated impure water, fall to the bottom of the casing, from which they are removed. The exterior surface of the tube is prepared by coating or finish to prevent material from sticking to the tube and building up thereon as a scale. A scraper adjacent the outer surface of the tube positively removes any scale that does form. The steam produced in the space between the tube and casing is preferably sent to a condenser operating at a partial vacuum. Pure water collects in the condenser and can be removed therefrom as desired. Alternatively, the steam can be wasted into the stack that carries off the products of combustion from the tube.

The foregoing arrangement is suitable for desalinization of water. In the case of sewage, the impure water fed to the spray nozzles is obtained by separating the liquid from the solid components. The lighter solid component or sludge is comminuted and fed to the tube counter current to the burning fuel, whereby the combustible part of the sludge is burned and the water therein is vaporized. The clinker resulting from burning and drying the sludge drops to the bottom of the tube, which is inclined toward the fuel inlet end, and removed.

In any case, the impure water and fuel oil may be preheated, e.g. by passing through a heat exchanger in the stack to extract heat from the products of combustion leaving the tube and from any steam wasted to the stack from the casing, or by passing through a condenser to extract heat from the steam leaving the casing, or by passing through water tubes lining the top or other parts of the statoinary casing to protect it against excessive temperatures.

Among the advantages of the invention, which will be described in greater detail hereinafter, are.

(1) High heat transfer ratio.
(2) Compactness.
(3) Configuration well adapted to transport.
(4) Simplicity of fabrication.
(5) Simplicity of operation.
(6) Reliability.
(7) Efficiency.

In the further detailed description of preferred embodiments of the invention reference will be made to the accompanying drawings wherein:

FIGURE 5 is a schematic view of the apparatus of FIGURES 1–4 adapted to and combined with other apparatus to provide means for purification of sewage.

Figure 1:
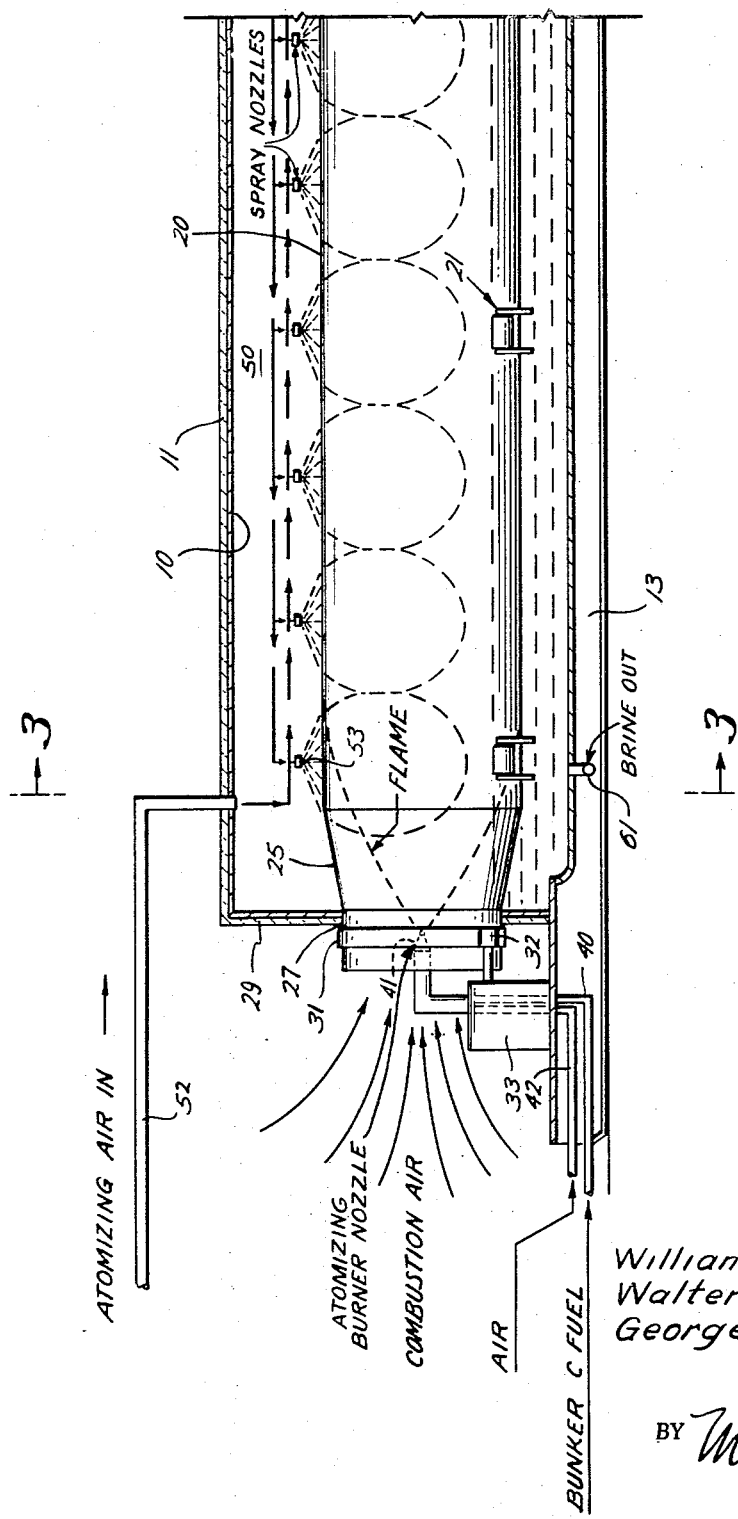
FIGURE 1 is a partially schematic axial vertical section through the burner end of an apparatus in accordance with the invention.
Figure 2:
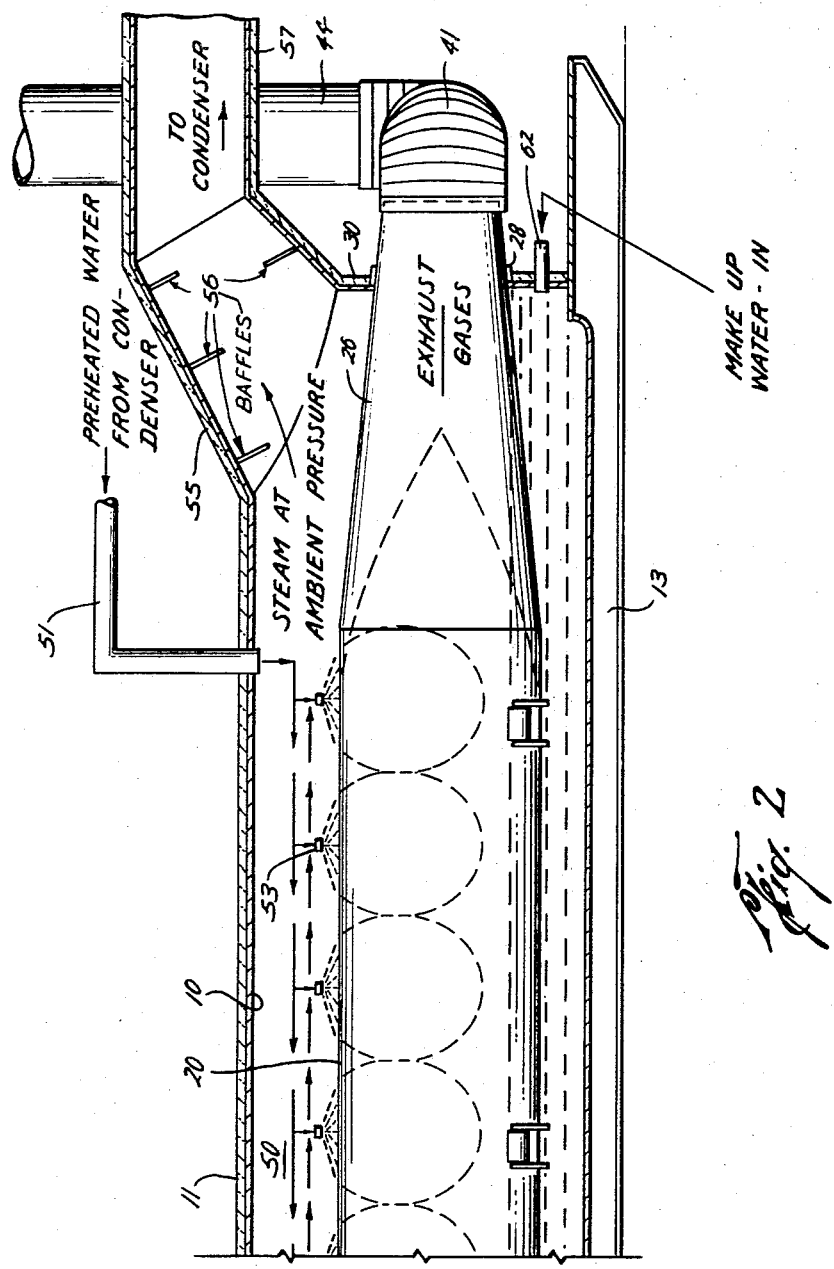
FIGURE 2 is a continuation of FIGURE 1 showing the stack end of the apparatus.

Referring now to FIGURES 1–4 there is shown a stationary tubular steel casing 10 covered with a layer of insulation 11. The casing is provided with flanged gusset plates 12 welded to the casing. Plates 12 in turn rest on and may be bolted or otherwise secured to I beams 13 extending the length of the casing.

Inside casing 10 a steel tube 20 is rotatably mounted on trunnion bearings 21. Each trunnion bearing comprises a roller 22 and end supports 22A, both of which are ceramic coated to protect against heat and corrosion. The supports 22A are welded to casing 10.

The exterior of tube 20 is coated with a layer of material having a low adhesion for substances to be encountered in the impure fluent. Preferably the coating layer is "Teflon." Absent any layer of coating material, the exterior of tube 20 should be machined or ground to a smooth finish. The exterior of tube 20, whether coated or not, should be smooth so as to reduce adherence of solids and to facilitate cooperation with scraper means 23.

Scraper 23 may comprise a plurality of overlapping leaf spring steel bars which are displaced from their relaxed position when the tube 20 is placed on trunnions 21. The scraper thus exerts a positive force against the side of the tube 20, keeping it in contact with tube 20 so as to constantly remove freshly formed salt, chemical, or other deposits from the tube.

Tube 20 is cylindrical throughout most of its length, but is provided with frusto-conical end portions 25, 26 at the burner and stack ends. End portions 25, 26 project through openings 27, 28 in the vertical end walls 29, 30 of casing 10 in freely rotatable relation therewith. Suitable means (not shown) may be provided to seal between end portions 25, 26 and openings 27, 28. However, although tube 20 may be heated to a temperature considerably in excess of the boiling point of the water or other liquid base of the fluent being treated, it is not necessary that the space between the tube and casing be sealed to withstand high pressure, for the apparatus can be operated with the pressure in this space at substantially atmospheric pressure, or above or below atmospheric pressure. A friction drive ring 31 secured to end portions 25 cooperates with friction drive roll 32 driven by variable speed motor-reduction gear unit 33 to turn the tube 20 at any desired rate of speed, the speed being adjusted to secure best operation of the apparatus depending on the type of impure water being treated and other factors.

The end of frusto-conical end portion 25 is open to the atmosphere to provide oxygen needed to maintain combustion in the tube. Fuel fluid, which may be liquid, gas, or powder, but preferably Bunker C oil, is supplied by conduit 40 to spray nozzle 41. Atomizing air is supplied to the nozzle through conduit 42. A suitable nozzle is one known as an "Astrospray" Series 3300 manufactured by Astrosonic, Incorporated, New York City under U.S. Patents 3,081,946 and 3,070,313.

Figure 3:
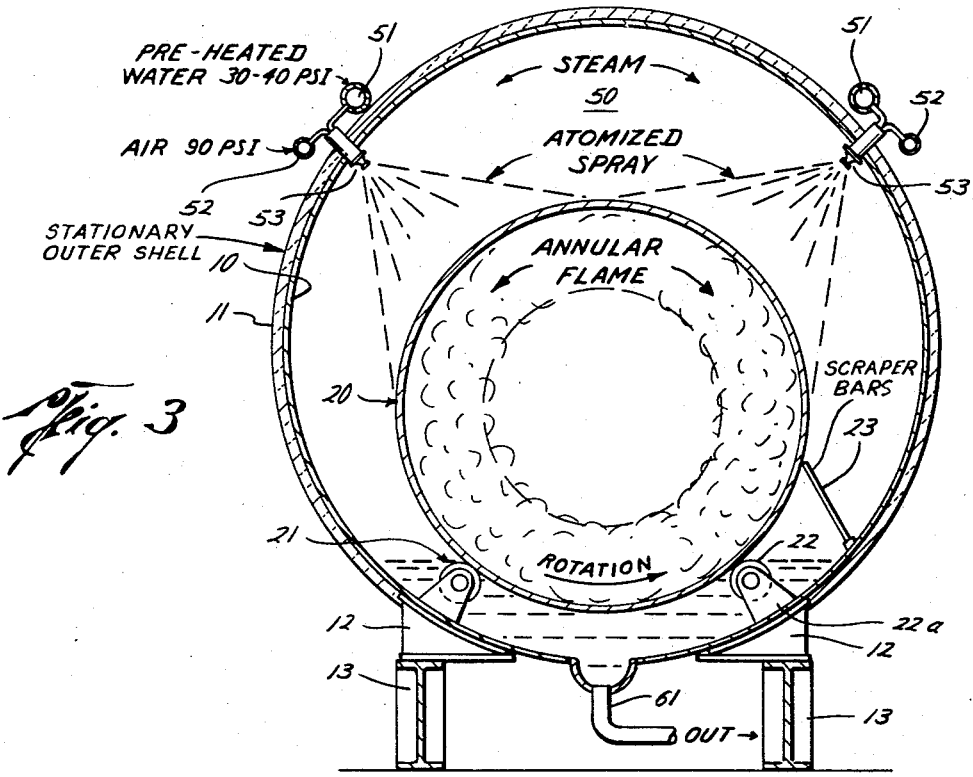
FIGURE 3 is a section taken at plane 3—3 of FIGURE 1.
Figure 4:
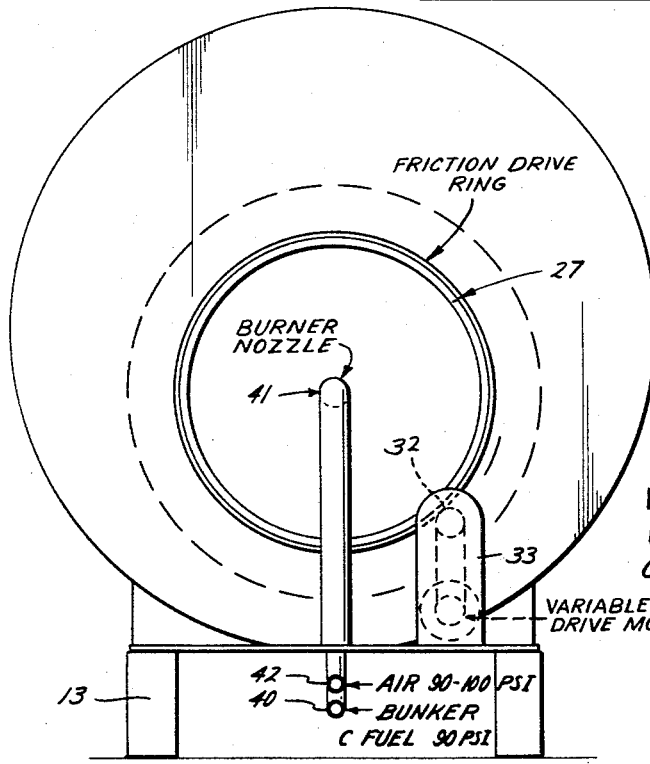
FIGURE 4 is an elevation of the burner end of the apparatus.

The fuel sprayed from the burner nozzle results in an annular flame extending down the fire tube adjacent the inner surface thereof as indicated in FIGURE 3. The products of combustion leave the tube through frusto-conical end portion 26 which is rotatably connected at its small end to one of stationary elbow 41. The other end of elbow 41 is connected to stack 44, exhausting to atmosphere.

Fluent is admitted to the space 50 between the tube and casing through conduit means 51. Air is admitted to space 50 through conduit means 52. The air and fluent are mixed and sprayed onto the surface of tube 20 by nozzles 53 disposed at intervals in space 50 along the length of the tube, preferably directly above the tube. The nozzles may be of the same type as the burner nozzle but will normally be of a different size. Astrospray series 1800 nozzles would be suitable. The liquid portion of the fluent will largely flash to steam or other vapor upon contact with tube 20. The steam will travel to outlet 55 at the end of the casing adjacent end portion 26 of the tube through which products of combustion exit. Outlet 55 is provided interiorly with baffles 56 to prevent solids and liquids entrained with the steam from escaping with the steam. Outlet 55 is connected by conduit 57 to a condenser (not shown) which may be of conventional type operating at a partial vacuum. The impure fluent can be used as a cooling medium for the condenser, in which case the fluent will pass through the condenser before entering conduit means 51. This will serve also to preheat the fluent before admission to the casing.

Materials removed from tube 20 by scraper means 23, together with unflashed liquids from the fluent, fall to the bottom of casing 10 and collect as a concentrated impure fluent or brine. The brine is removed continuously or periodically through outlet 61 in the bottom of casing 10. At times it will be desirable to add water to the bottom of the casing in order to dissolve salts precipitating out of the brine or to flush out the casing. Such make-up and flush water can be introduced through inlet 62.

Referring now to FIGURE 5, there is shown an adaptation of the apparatus of FIGURES 1–4 to sewage treatment. The casing 10A is modified slightly to dispose the tube 20 at a slight incline, the lower end being the end adjacent burner nozzle 41. Sludge removed from the sewage prior to admission of the sewage to the spray nozzles 53 is admitted to the upper end of the tube 20 through inlet conduit means 70. The combustible materials in the sludge are burned inside tube 20 and the residue or sludge clinker falls down the inclined tube 20 and out the lower end of the tube onto conveyor means 71. The conveyor means dumps the clinker into grinder 72. The powdered sludge produced by the grinder drops into bin 73. The bottom of bin 73 connects to sacker 74 which empties into sacks 75. The product in the sacks is useful as fertilizer.

The sludge fed to tube 20 to produce the fertilizer is a component of the raw sewage which enters the sewage treatment apparatus through conduit 80. Conduit 80 dumps the sewage into grit tank means 81 wherein the dense materials 82 fall to the bottom for periodic removal through outlet 83. The lighter sewage material flows out of the top of tank means 81 through conduit 84 into comminutor tank means 85 including rotating foraminous shredder 86 and electric motor 87. The resultant sludge drops from the bottom of the comminutor onto the lower end of conveyor means 88 extending under the comminutor means. The upper end of conveyor means 88 dumps the sludge into sludge inlet conduit means 70.

Liquid falling from the bottom of comminutor means 85 drops into settling tank means 90. The liquid is pumped out of tank means 90 by pump 91 which delivers it through heat exchanger 92 to fluent conduit means 51 connected to spray nozzles 53.

Heat exchanger 92 is mounted in stack 44 to extract heat from the products of combustion leaving the upper end of tube 20 and from steam leaving the casing 10, the steam in this case being connected by conduit 57 to the stack rather than to a condenser. Farther up the stack there is a ring burner 93 to insure complete combustion of all materials passing up the stack. There are baffles in the stack to prevent escape of solids entrained in the stack gas.

Fuel oil for the ring burner 93 is supplied through conduit 96 from tank 97. Conduit 98 carries fuel oil to tube 99 adjacent the top wall of casing 10A inside space 50 where the oil is preheated as it cools the top of the casing. Tube 99 connects to fuel inlet conduit 40 which delivers the fuel to nozzle 41 where it joins the atomizing air entering through conduit 42.

Especially in the case of a desalinization operation, wherein there is a great deal of salt in the concentrate or brine collecting in the bottom of casing 10A, but also in the case of treatment of sewage of high salts content, the brine may be withdrawn from tank 10A by a pump 110 and delivered to a drying tank 111. Hot air or gas may be tapped off elbow 41 at the stack end of tube 20 and fed to the tank 111 through conduit 112. The hot air leaves tank 111 through stack 113. A vent pipe 114 from settling tank 90 connects into hot air stack 113. Periodically dry salt or salts collected in tank 111 can be removed through doors 115 in the side of tank 111.

It is believed that the method of the invention is clear from the foregoing description of preferred apparatus for accomplishing the method. Summarizing, impure fluent is sprayed onto the exterior of a heated tube. The tube is kept at high temperature at the area of contact with the fluent by rotating the tube. The resulting flash of the fluent separates the volatile liquid components from the remainder of the fluent by converting the volatile liquid components to steam and vapor. The non-vaporizing constituents of the fluent fall away from the vaporized portion of the fluent while the latter leaves as a stream of pure fluid. The tube is heated by injecting an annular spray of burning combustible material. If the fluent to be purified includes combustible solids, the latter are separated from the remainder of the fluent, e.g. by gravity, and the sludge removed from the fluent is comminuted and fed to the heated tube counter current to the stream of burning fluid injected at the other end of the tube. The combustibles in the sludge are burned, the liquid therein vaporized, and the resultant dry clinker is ground to a powder to provide sterile fertilizer.

The steam produced by flashing the impure fluent may be condensed and recovered and used, e.g. for irrigation or for industrial purposes, or it may be wasted through the stack with the products of combustion. The latter procedure may be preferred when there is no available market for the purified water, for example when the invention is used as a method of disposing of salt water produced by oil wells located in remote areas, or when the invention is used in metropolitan areas for the treatment of sewage and industrial water is not in demand.

While preferred embodiments of the invention have been shown and described many modifications thereof can be made by one skilled in the art without departing from the spirit of the invention.

What is claimed is:
1. Apparatus for treatment of liquid base fluent comprising:
    a casing,
    a tube rotatably mounted in the casing with a space between the tube and casing,
    means to admit fluent into said space and direct it to flow into contact with the tube, means whereby the tube can be caused to rotate in the casing, means to admit combustible material into one end of the tube, means to exhaust products of combustion from the other end of the tube, means providing for the exit of vapor from said space produced when liquid in said fluent flashes upon contact with the tube, and outlet means in the casing to allow withdrawal of the non-vaporized residue of the fluent remaining after flashing of liquid thereof, characterized by the fact that said tube is mounted with its axis inclined downwardly toward the end at which is located the means to admit combustible material, and including:
   means to separate sludge from the fluent prior to admission of the fluent to said space, and
   means to feed said sludge to said end of the tube from which products of combustion are exhausted.

2. Combination according to claim 1 wherein said means to separate sludge from the fluent comprises:
   (a) grit tank means to receive the raw sewage and allow dense material to settle to the bottom thereof,
   (b) comminutor means to receive the outflow from the grit tank means and finely divide solid materials contained therein,
   (c) conveyor means extending beneath the comminutor means to receive the sludge falling therefrom and extending to said means to feed sludge to the tube,
   (d) settling tank means extending beneath said comminutor means to receive the remainder of the fluent falling from said comminutor means prior to admission thereof to said space.

3. Combination according to claim 1 wherein said fluent is sewage, and including:
   means to withdraw sludge clinker from the lower end of said tube, and
   means to grind the sludge clinker to a powder ready for sacking as fertilizer.

4. Method of treating a liquid base fluent comprising:
   rotating a tube inside of a casing,
   heating the tube interiorly by flowing burning combustibles therethrough to raise the temperature of the exterior of the tube above the boiling point of the liquid base of the fluent,
   finely dividing the fluent and contacting the exterior surface of the tube therewith to flash the liquid base of the fluent to vapor,
   removing the vapor from the casing,
   said method further including separation of sludge from the fluent prior to finely dividing the fluent and the contacting of the tube therewith, and
   feeding the sludge to the tube to burn the combustible portion of the sludge and dry the remainder thereof to form sludge clinker.

5. Method according to claim 4 including:
   comminuting the sludge prior to feeding it to the tube,
   the comminuted sludge being fed to the tube counter current to the first mentioned flow of combustible materials therethrough.

6. Method according to claim 5 wherein the fluent is sewage, and including:
   removing the sludge clinker from the tube,
   reducing the clinker to a powder, and
   sacking the powder for use as fertilizer.

7. Method of treating a liquid base fluent comprising:
   rotating a tube inside of a casing,
   heating the tube interiorly by flowing burning combustibles therethrough to raise the temperature of the exterior of the tube above the boiling point of the liquid base of the fluent,
   finely dividing the fluent and contacting the exterior surface of the tube therewith to flash the liquid base of the fluent to vapor,
   removing the vapor from the casing,
   said method further including:
   removing from the casing the residue of the fluent that remains after the liquid base thereof has been flashed, and
   drying the residue by heating the residue with products of combustion of said combustible materials used to heat the tube, said fluent being salt water.

References Cited

UNITED STATES PATENTS

| | | | |
|---|---|---|---|
| 654,470 | 7/1900 | Mather | 159—12 |
| 788,446 | 4/1905 | Wilson. | |
| 868,446 | 10/1907 | Just | 159—8 |
| 1,501,515 | 7/1924 | Testrup | 159—12 |
| 1,837,702 | 12/1931 | Canfield. | |
| 2,321,732 | 6/1943 | Brant | 18—47 |
| 2,859,482 | 11/1958 | Warren et al. | 117—65.2 X |
| 2,860,991 | 11/1958 | Christianson et al. | 99—109 |
| 2,867,523 | 1/1959 | Lutz et al. | 23—313 X |
| 3,019,477 | 2/1962 | Kleist | 18—2.5 |
| 3,211,325 | 10/1965 | Wisnicki | 220—64 |

FOREIGN PATENTS 292,399  11/1953  Switzerland.

NORMAN YUDKOFF, *Primary Examiner.*

WILBUR L. BASCOMB, JR., *Examiner.*

J. SOFER, *Assistant Examiner.*